US009843238B2

(12) United States Patent
Wilson et al.

(10) Patent No.: US 9,843,238 B2
(45) Date of Patent: Dec. 12, 2017

(54) CLOSE COUPLED ADAPTER FOR A GENERATOR SET

(71) Applicant: Electro-Motive Diesel, Inc., LaGrange, IL (US)

(72) Inventors: Jess Wilson, Lisle, IL (US); James Blase, LaGrange, IL (US); Grace Madden, LaGrange, IL (US); Michael Colarossi, Forest Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 348 days.

(21) Appl. No.: 14/682,209

(22) Filed: Apr. 9, 2015

(65) Prior Publication Data
US 2016/0301284 A1   Oct. 13, 2016

(51) Int. Cl.
*H02K 5/00* (2006.01)
*H02K 7/18* (2006.01)
*H02K 5/24* (2006.01)

(52) U.S. Cl.
CPC ............. *H02K 7/1815* (2013.01); *H02K 5/24* (2013.01)

(58) Field of Classification Search
CPC .............................. H02K 7/1815; H02K 15/14
USPC .................................. 310/75 D, 75 R, 89, 91
See application file for complete search history.

(56) References Cited

U.S. PATENT DOCUMENTS

| 4,909,200 | A | 3/1990 | Sumi | |
|---|---|---|---|---|
| 5,072,704 | A | 12/1991 | Webb | |
| 7,370,716 | B2 | 5/2008 | Hickam | |
| 2007/0145745 | A1* | 6/2007 | Woods | F01P 3/00 290/1 A |
| 2010/0052442 | A1* | 3/2010 | Savant | H02K 7/108 310/78 |
| 2011/0001402 | A1* | 1/2011 | Himmelmann | F16D 3/74 310/75 D |
| 2014/0159517 | A1* | 6/2014 | Furuya | H02K 5/02 310/43 |
| 2014/0346780 | A1* | 11/2014 | Holder | H02K 7/1815 290/1 A |
| 2015/0130312 | A1* | 5/2015 | Golka | F02N 11/04 310/89 |

FOREIGN PATENT DOCUMENTS

EP            1889782 B1      8/2009

* cited by examiner

*Primary Examiner* — Thanh Lam
(74) *Attorney, Agent, or Firm* — Miller, Matthias & Hull LLP

(57) ABSTRACT

An adapter is used to couple a prime mover body to a housing of a generator. The adapter has openings that allow an armature of the generator to be attached to the flywheel of the prime mover. The adapter provides a torque coupling between the prime mover and the generator so that the attachments of the prime mover and generator to the skid, as well as the skid itself, can be reduced in size and weight because they no longer need to oppose the prime mover-generator torque load. A thickness of the adapter and a pattern of the openings in the body of the adapter are selected to move any natural resonance frequencies of the adapter outside an operating frequency of the prime mover.

8 Claims, 6 Drawing Sheets

CLOSE COUPLED ADAPTER FOR A GENERATOR SET

TECHNICAL FIELD

The present disclosure relates to generator sets and more particularly to an adapter that couples a locomotive prime mover to an electric generator.

BACKGROUND

A generator set includes a prime mover, such as a diesel or gas engine and a generator that produces electric power. A modern locomotive, among many components, uses a generator set to drive one or more electric motors to move the locomotive and any train cars attached to the locomotive. The prime mover generates mechanical torque which is transferred to the generator to make electrical power that is used to drive the electric motors. Both the prime mover and the generator are attached to a skid or bed using respective feet which are fixed to the skid, typically with bolts.

The driveshaft or crankshaft of the prime mover is mechanically coupled to the armature shaft of the generator either directly or using intermediate parts. Torque is generated at the prime mover during acceleration or normal running. Negative torque may be developed at the generator during engine braking, if used.

As known from simple action-reaction physics, energy in the form of torque that turns the drive and armature shafts must be opposed in an equal and opposite manner. In this case, this opposition force is provided by the housing and feet connections to the skid for both the prime mover and generator. These mechanical attachments keep the prime mover and generator from moving with respect to each other as the energy from the prime mover is transferred via the crankshaft to the generator.

With respect to mounting a prime mover to a generator, EP 1,889,782 (the '782 patent) granted Aug. 26, 2009 to Yanmar Co., Ltd. describes a generator casing that is mounted onto to a gas engine prime mover and around an output drive shaft. The generator casing has stator coils that are mounted in proximity to permanent magnets attached to the output drive shaft. The '782 patent mounts the generator casing directly on the gas engine which requires splines on the output drive shaft for assembly. The '782 patent fails to teach a close coupled adapter that couples a prime mover housing to a separate generator housing while allowing access to the crankshaft connection.

SUMMARY OF THE DISCLOSURE

In an aspect of the disclosure, a method of constructing a generator set includes mounting a prime mover on a skid, mounting a generator on the skid, and coupling a body of the prime mover to a housing of the generator using a close coupled adapter. The close coupled adapter may be attached to either the prime mover or the generator prior to mounting both the prime mover and the generator on the skid. The close coupled adapter may include a front mounting ring adapted for mechanical attachment to the body of the prime mover, a back mounting ring adapted for mechanical attachment to the housing of the generator, and a sidewall. The sidewall may be cylindrical in shape and coupled between the front mounting ring and the back mounting ring. The sidewall may also have a plurality of apertures that accommodate access to an interior space of the close coupled adapter, each of the plurality of apertures having three or fewer sides. The method may also include coupling an armature shaft of the generator to a flywheel of the prime mover using fasteners inserted into the interior space of the close coupled adapter via one or more of the plurality of apertures.

In another aspect of the disclosure, a close coupled adapter for use in a generator set having a prime mover that drives a generator may include a front mounting ring adapted for mechanical attachment to a prime mover housing, a back mounting ring adapted for mechanical attachment to a generator housing, and a sidewall. The sidewall may have a cylinder-shape and be coupled between the front mounting ring and the back mounting ring. The sidewall may have a plurality of triangular or oval apertures that accommodate access to an interior space of the close coupled adapter via one of the apertures.

In yet another aspect of the disclosure, a generator set may include a skid, a prime mover mechanically attached to the skid, the prime mover including a body and a flywheel coupling, and a generator mechanically attached to the skid, the generator including a housing and an armature coupling. The generator set may also include a close coupled adapter that directly connects between the body of the prime mover and the housing of the generator. The close coupled adapter may include a front mounting ring adapted for mechanical attachment to the body of the prime mover, a back mounting ring adapted for mechanical attachment to the housing of the generator and a sidewall. The sidewall may be in a cylinder shape and be disposed between the front mounting ring and the back mounting ring. The sidewall may have a plurality of apertures, each with three or fewer sides that accommodate access to an interior space of the close coupled adapter via one of the plurality of apertures.

DETAILED DESCRIPTION

Generator sets use a prime mover, such as a diesel or gasoline engine, to drive a generator in order to make electric power. Generator sets range in size and power from small consumer units that may be used at a campsite to larger commercial units that may supply backup power to hospitals or other buildings.

Figure 1:
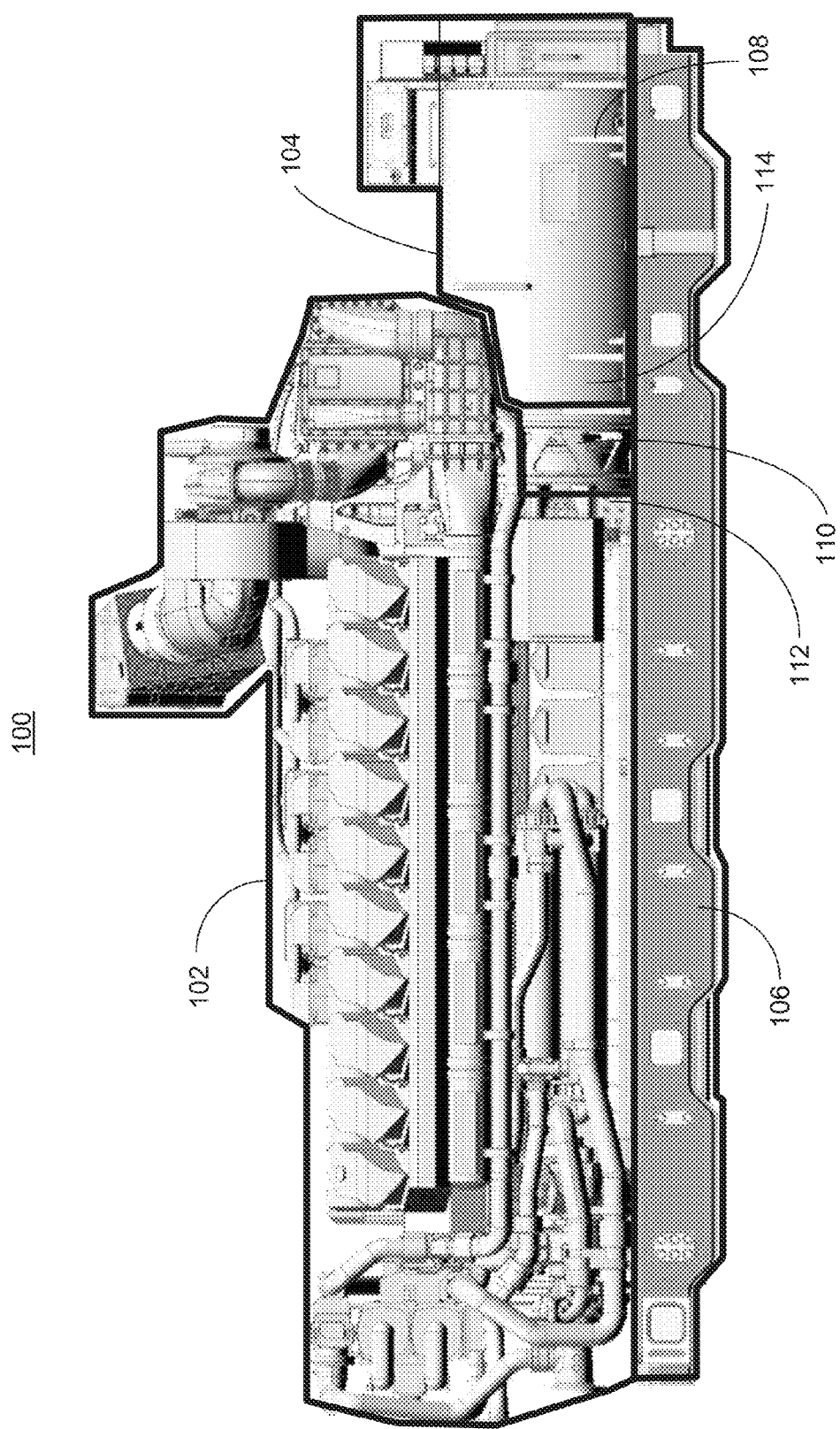
FIG. 1 is a side view of a generator set.

One particular application of generator sets is in locomotives where the electric power generated is used to power electric traction motors that propel the locomotive and any railroad cars coupled to the locomotive. A locomotive generator set 100 is illustrated in FIG. 1. In most locomotive applications a prime mover 102 may be a diesel engine. A generator 104 converts mechanical power from the prime mover 102 into electrical energy. A skid 106 provides a base for both the prime mover 102 and the generator 104. The skid 106 may also provide a base for the traction motors and trucks (or wheel assemblies).

In prior art applications, the torque transferred between the prime mover 102 and the generator 104 via the crankshaft and armature shaft is opposed by mounts (not depicted in FIG. 1) of the prime mover 102, their attachment to the skid, the skid 106 itself, and the mounts 108 of the generator 104 and their attachments to the skid. If the torque load of the prime mover 102 is not taken into consideration during the design, the torque load of the prime mover is significant enough to break the mounts 108 and twist the skid 106. This causes the respective mounts 108 and the skid 106 itself to be increased in size and strength over what is necessary to support the respective prime mover 102 and generator 104 themselves.

Even though locomotives are by nature large, there is pressure to meet emission standards in addition to market competition for fuel economy, both of which drive weight considerations for locomotives. In order to reduce the weight and increase the fuel economy of the generator set a close coupled adapter 110 can be attached to both a body 112 of the prime mover 102 and a housing 114 of the generator. The close coupled adapter 110 mechanically connects the prime mover 102 to the generator 104 so that the torque load of the prime mover 102 is born by the respective body 112 of the prime mover 102 and housing 114 of the generator 104 via the close coupled adapter 110.

Because the mounts 108 and the skid 106 no longer need to oppose the twist created between the prime mover 102 and the generator 104, the mounts 108 and the skid 106 can be redesigned to provide only the necessary support for their respective loads and expected over-the-rails conditions. This redesign may lower not only the cost but also the weight of the mounts 108 and skid 106, in some cases, significantly enough to affect both fuel economy and emissions of the finished locomotive even when the weight of the close coupled adapter 110 is accounted for.

Attempts to use similar adapters in the past have failed for two primary reasons. The first is that parallel, 90° connecting struts, were unable to sustain the torque load required. The second is that the adapters are subject to vibration modes of natural resonance frequencies that correspond to prime mover 102 operational frequencies over its range of operating speeds. That is, as the prime mover 102 increases its operating speed, these prior art adapters have a natural resonance frequency, or more than one, that cause the adapter to vibrate violently as the prime mover 102 operates at that corresponding speed. This vibration can destabilize the adapter so that it cannot support the torsion load between the prime mover 102 and generator 104 and can experience a catastrophic mechanical failure.

Figure 2:
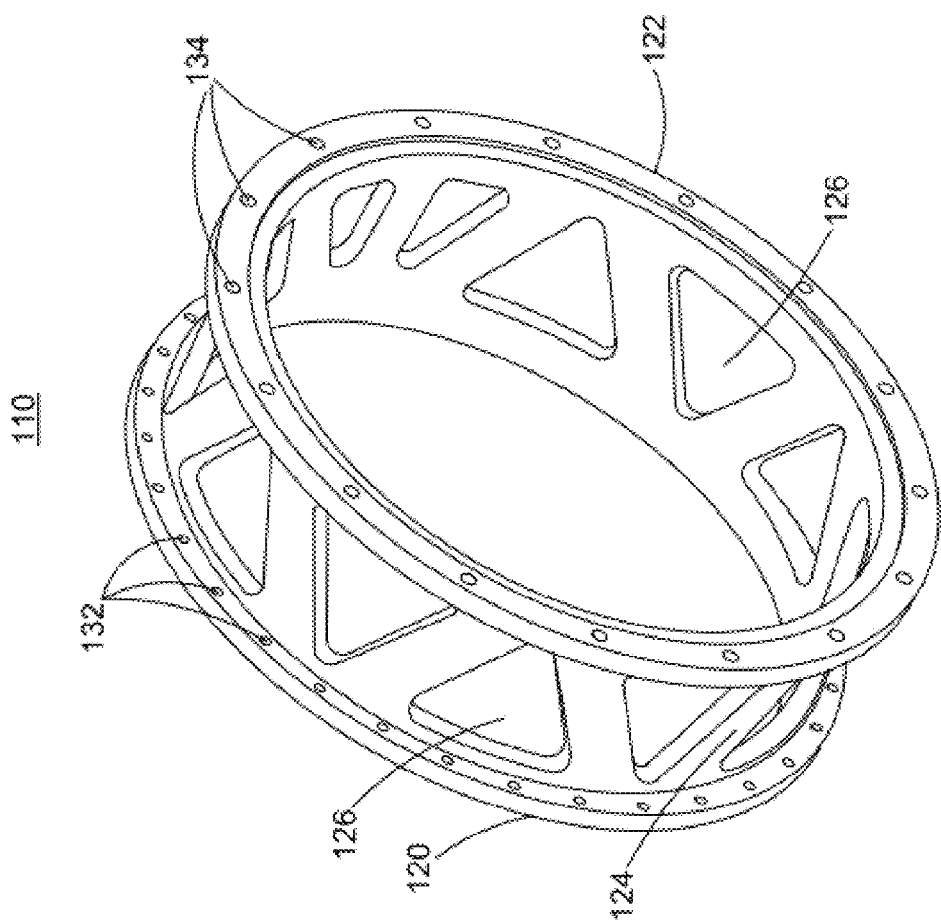
FIG. 2 is a perspective view of an exemplary close coupled adapter.

FIG. 2 illustrates an embodiment of a close coupled adapter 110. The close coupled adapter 110 includes a front mounting ring 120 and a back mounting ring 122. The front mounting ring 120 is adapted to be attached to a body 112 of the prime mover 102. The back mounting ring 122 is adapted for attachment to a housing 114 of the generator 104. Mounting holes 132 on the front mounting ring 120 are spaced in a pattern that is distinct from the spacing of the mounting holes 134 of the back mounting ring 122. In the illustrated embodiment, this ensures that the front mounting ring 120 is always fastened to the body 112 of the prime mover 102 and the back mounting ring 122 is always fastened to the housing 114 of the generator 104.

A sidewall 124 of the close coupled adapter 110 may be cylindrical in shape with a pattern of apertures 126. The pattern of apertures 126 may leave the sidewall 124 in an angular strut pattern.

The close coupled adapter 110 may have the struts/apertures arranged to accomplish several goals. The apertures 126 allow access inside the perimeter of the sidewall 124. These apertures may be used to allow access for attaching fasteners used to connect an armature shaft of the generator 104 to a flywheel of the prime mover 102. This attachment is discussed in more detail below with respect to FIG. 4. In an embodiment, the apertures 126 may be in a triangular shape. In another embodiment, the triangular apertures may be in multiple rows. In such an embodiment, the sidewall pattern may form an x-shape.

The apertures 126 and pattern of the sidewall 124 provide torsional stiffness that allows the close coupled adapter 110 to withstand the torsional load that is primarily developed by the prime mover 102 but may also result from the generator during braking. A benefit of the apertures 126 is a reduction in weight of the close coupled adapter 110. The aperture pattern also allows the close coupled adapter 110 to be tuned to avoid natural frequencies that might cause vibration modes resulting from natural resonance frequencies developed in the prime mover 102 over its range of operating speeds. The thickness and composition of the sidewall as well as the aperture sizes and pattern affect resonance frequencies as well as weight and torsion strength.

Figure 3:
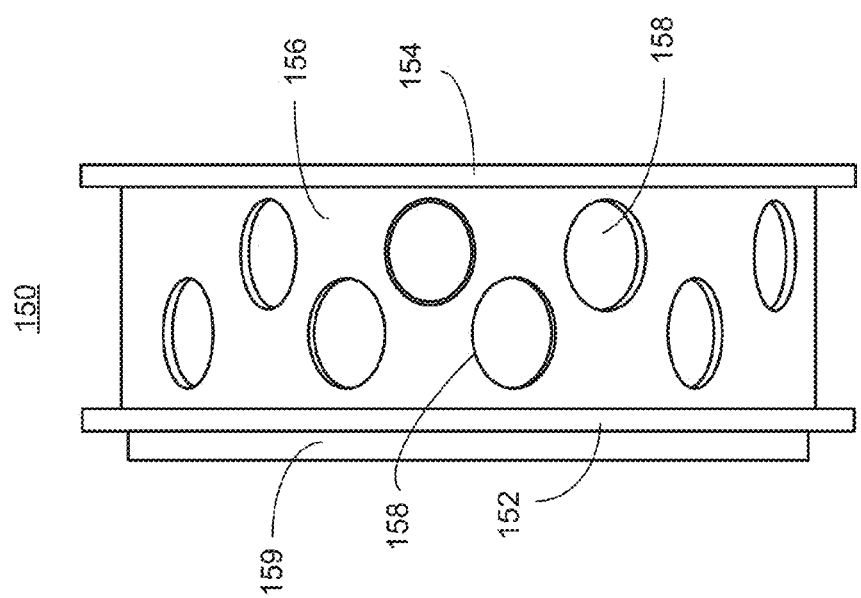
FIG. 3 is a side view of another embodiment of a close coupled adapter.

FIG. 3 illustrates another embodiment of the close coupled adapter 150 that has a front mounting ring 152 and a back mounting ring 154 with apertures 158 that form a sidewall pattern 156. The oval apertures 158 of this embodiment, which in some embodiments may be circular, still form an angular sidewall pattern similar to that of the close coupled adapter 110 of FIG. 2. An alignment lip 159, found in both the embodiments illustrated in FIG. 2 and FIG. 3 but shown only in FIG. 3 is discussed below. Thus, the apertures 126 and 158 in the illustrated embodiments, have three or fewer sides. That is, the apertures 126 have three sides and the apertures 158 have one side.

Figure 4:
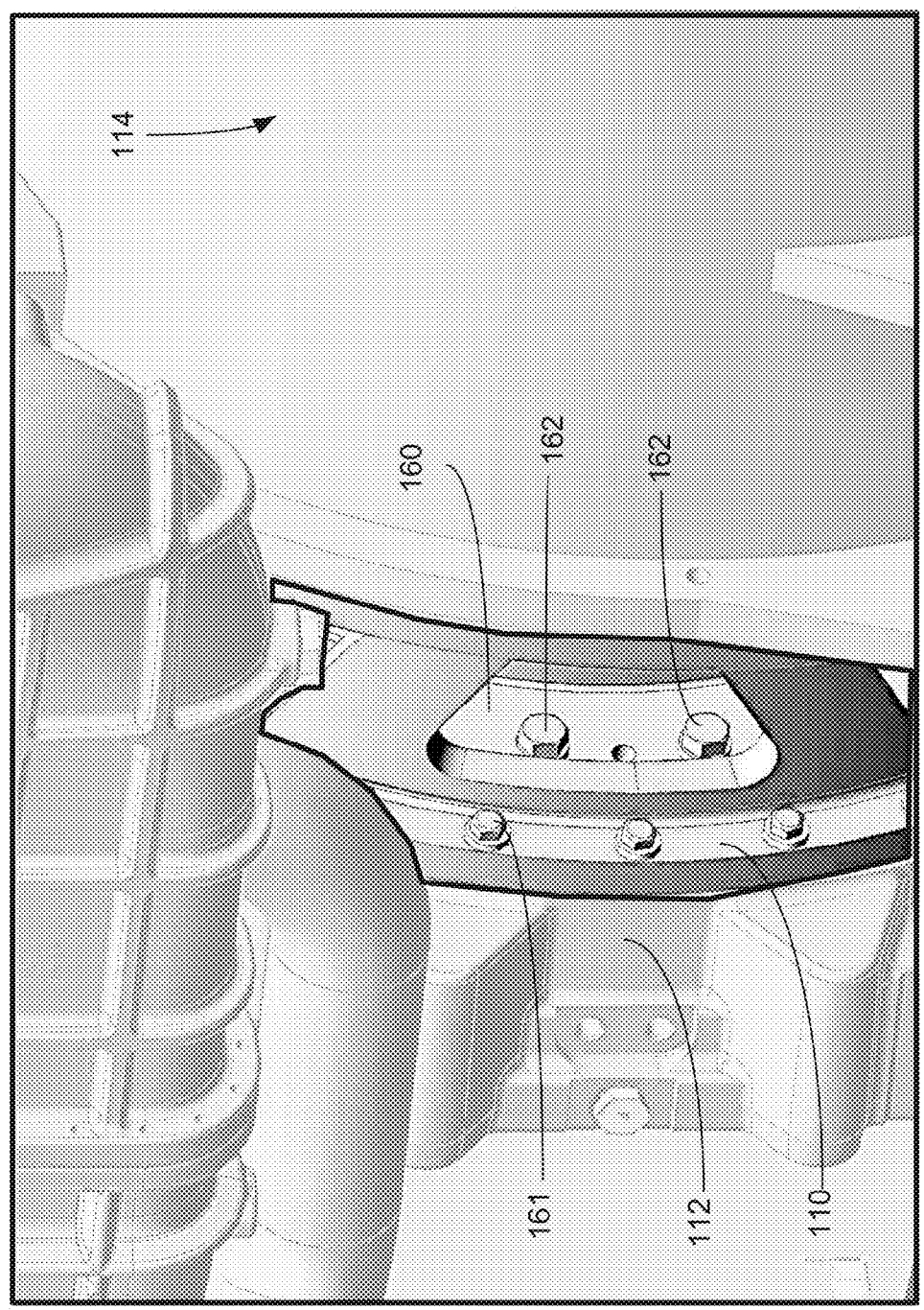
FIG. 4 is a perspective view of a portion of the generator set of FIG. 1 showing the close coupled adapter.

FIG. 4 is a perspective view of a close up of the attachment of the prime mover 102 to the generator 104 using a close coupled adapter 110. More particularly, the close coupled adapter 110 is attached to a housing 114 of the generator 104 and the body 112 of the prime mover 102. The close coupled adapter 110 may be attached to the housing 114 using a first set of fasteners (not depicted) at the back mounting ring 122 and then the close coupled adapter 110 and the generator 104 may be moved into place and coupled to the body 112 of the prime mover 102 using fasteners 161. An armature 160 of the generator 104 may be coupled to a flywheel (not depicted in FIG. 4) of the prime mover 102 using fasteners 162. While the close coupled adapter 110 is fixed, the armature 160 is free to rotate inside the close coupled adapter 110.

Figure 5:
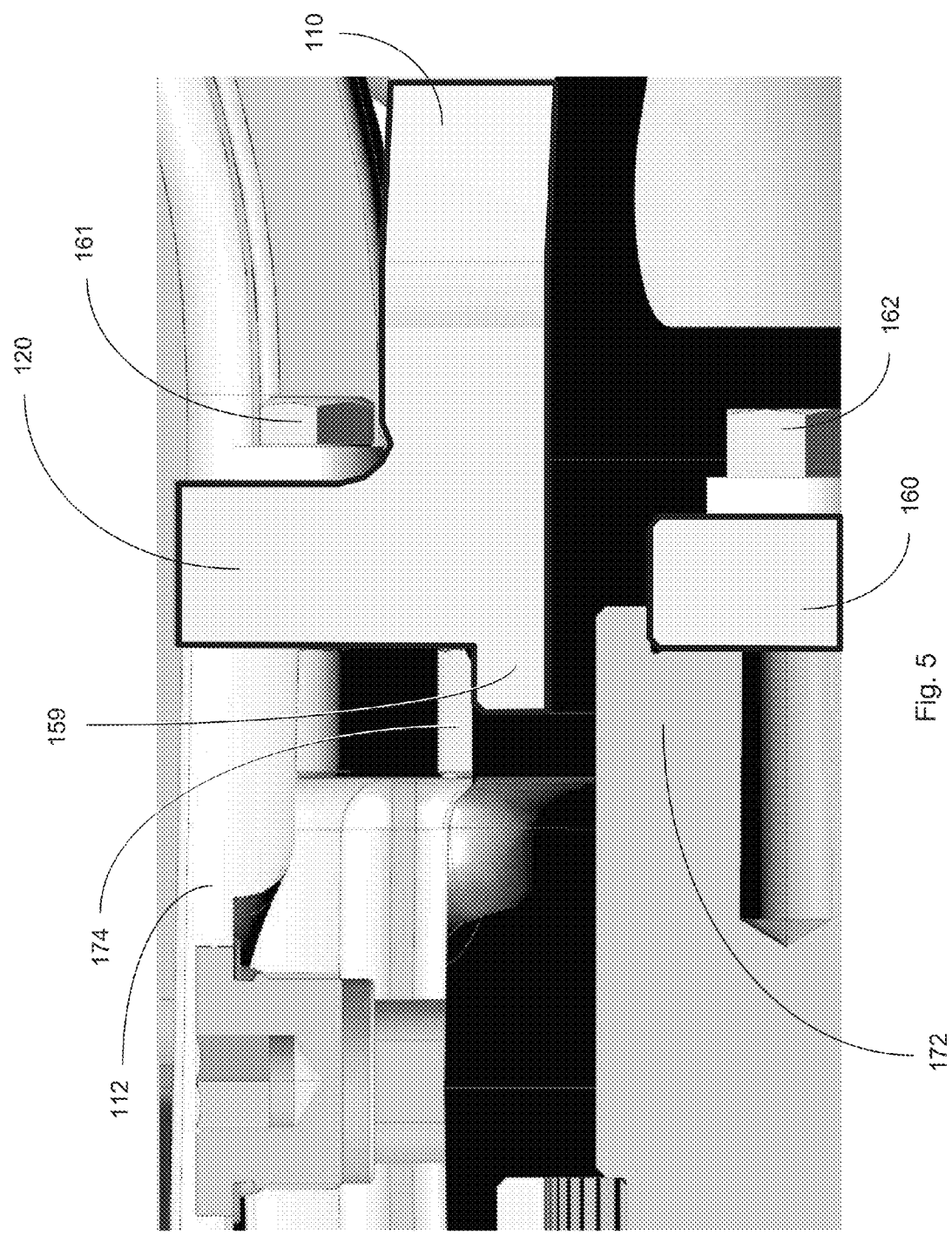
FIG. 5 is a cutaway view of a portion of the generator set.

FIG. 5 is a cutaway view of a portion of the generator set 100 that illustrates mechanical alignment of the close coupled adapter 110 with the body 112 of the prime mover 102. As discussed above, in an assembly procedure of one embodiment, the close coupled adapter 110 is first attached to the housing 114 of the generator 104 and that subassembly is attached to the body 112 of the prime mover 102. In order to ensure that an armature 160 is aligned with a corresponding flywheel 172 of the prime mover 102, an alignment lip 159 of the front mounting ring 120 may be mated with a seat 174 of the body 112 of the prime mover 102. While the above discussion refers to an armature 160 of the generator 104 and a flywheel 172 of the prime mover 102, it is understood that in some embodiments these actual components may not be directly connected but may rather have an intermediate component present, such as a torsional coupling that is attached to the armature 160 and then bolted to the flywheel.

INDUSTRIAL APPLICABILITY

Figure 6:
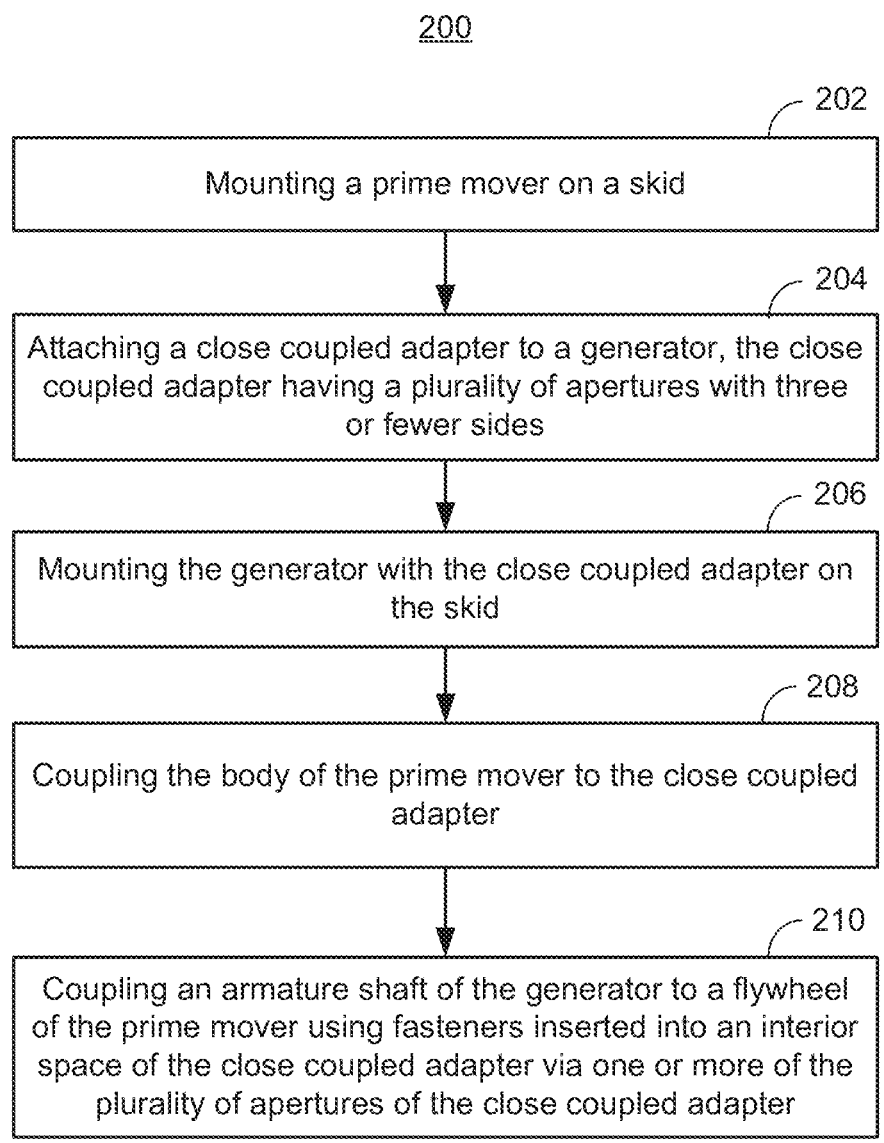
FIG. 6 is a flowchart of an exemplary method of assembling a generator set.

FIG. 6 is a flow chart of one exemplary method 200 of manufacturing a generator set 100. At block 202, a prime mover 102 may be mounted on a skid 106. In other embodiments, this step may be performed after a generator 104 and the prime mover 102 are assembled as discussed below.

At block 204, a close coupled adapter 110 may be attached to a generator 104. The back mounting ring 122 may have mounting holes 134 that uniquely match a pattern of threaded holes on the generator housing 114 so that the close coupled adapter 110 can only be mounted in one direction between the generator 104 and the prime mover 102.

At block 206, the generator with the close coupled adapter 110 assembled to it may be mounted to the skid 106. When placing the close coupled adapter/generator arrangement on the skid 106, an alignment lip 159 of the close coupled adapter may be engaged with a corresponding seat 174 of the prime mover 102 to ensure that an armature 160 of the generator aligns axially with a crankshaft of the prime mover 102 at the flywheel 172.

At block 208, a body 112 of the prime mover 102 may be coupled to the close coupled adapter 110. The mounting holes 132 may be aligned with matching holes in the body 112 of the prime mover 102 and bolted or screwed in place with fasteners 161. In other embodiments, other fastening techniques may be used.

At block 210, an armature 160 of the generator 104 may be fastened to a flywheel 172 of the prime mover 102 using fasteners 162 that are inserted through one or more apertures 126 of the close coupled adapter 110. The apertures 126 allow both the fastener 162 to be inserted but also allow sufficient clearance for a tool to be inserted at least partially into the interior space of the close coupled adapter 110 so that the fastener 162 can be tightened. The armature 160 or flywheel 172, or both may need to be rotated to both initially align the holes and to allow access to insert fasteners at each required location.

The assembly steps may be performed in different sequences based on particular manufacturing requirements. For example, the close coupled adapter 110 may be first attached to the prime mover 102 and this assembly attached to the generator 104 with a re-orientation of the alignment lip 159 to allow connection between the flywheel 172 and armature 160.

By solving the problems of interior access, support strength, and vibration mode, the close coupled adapter 110 benefits both manufacturers and operators of generator sets 100 by reducing overall weight and simplifying the assembly process. In the case of locomotives, this lower weight may also provide benefits for lower cost of operation and better emissions performance. Ease of maintenance is supported by continued access to the armature/flywheel connection. Assembly efficiency may also be improved because cumbersome pilot rods for crankshaft alignment may be eliminated by the use of the alignment lip 159 of the close coupled adapter 110.

What is claimed is:

1. A close coupled adapter for use in a generator set having a prime mover that drives a generator, the close coupled adapter comprising:
   a front mounting ring adapted for mechanical attachment to a prime mover housing;
   a back mounting ring adapted for mechanical attachment to a generator housing; and
   a sidewall having a cylinder-shape coupled between the front mounting ring and the back mounting ring, the sidewall having a plurality of three or fewer sided apertures that accommodate access to an interior space of the close coupled adapter via one of the apertures.

2. The close coupled adapter of claim 1, further comprising an alignment lip on the front mounting ring that engages the prime mover housing to align an armature shaft of the generator to a flywheel coupling of the prime mover.

3. The close coupled adapter of claim 1, having mutually exclusive front and back mounting hole patterns in the front mounting ring and the back mounting ring, respectively.

4. The close coupled adapter of claim 1, having a sidewall thickness and aperture pattern having a natural resonance frequency outside a range of operating speeds of the prime mover.

5. A generator set comprising:
   a skid;
   a prime mover mechanically attached to the skid, the prime mover including a body and a flywheel coupling;
   a generator mechanically attached to the skid, the generator including a housing and an armature coupling; and
   a close coupled adapter that directly connects between the body of the prime mover and the housing of the generator, the close coupled adapter including:
      a front mounting ring adapted for mechanical attachment to the body of the prime mover;
      a back mounting ring adapted for mechanical attachment to the housing of the generator; and
      a sidewall having a cylinder-shape coupled between the front mounting ring and the back mounting ring, the sidewall having a plurality of apertures, each with three or fewer sides that accommodate access to an interior space of the close coupled adapter via one of the plurality of apertures.

6. The generator set of claim 5, wherein the close coupled adapter includes an alignment lip on the front mounting ring that mates with a corresponding feature of the body of the prime mover to align the armature coupling with the flywheel.

7. The generator set of claim 5, having mutually exclusive front and back mounting hole patterns that only align with corresponding mounting holes on the body of the prime mover for the front mounting ring and the housing of the generator for the back mounting ring.

8. The generator set of claim 5, wherein a sidewall composition and thickness and a pattern of the plurality of apertures is selected to avoid a natural resonance frequency over a range of operating speeds of the prime mover.

\* \* \* \* \*